N. B. BRALY.
HOSE SUSPENSION.
APPLICATION FILED NOV. 22, 1916.
1,261,008. Patented Apr. 2, 1918.
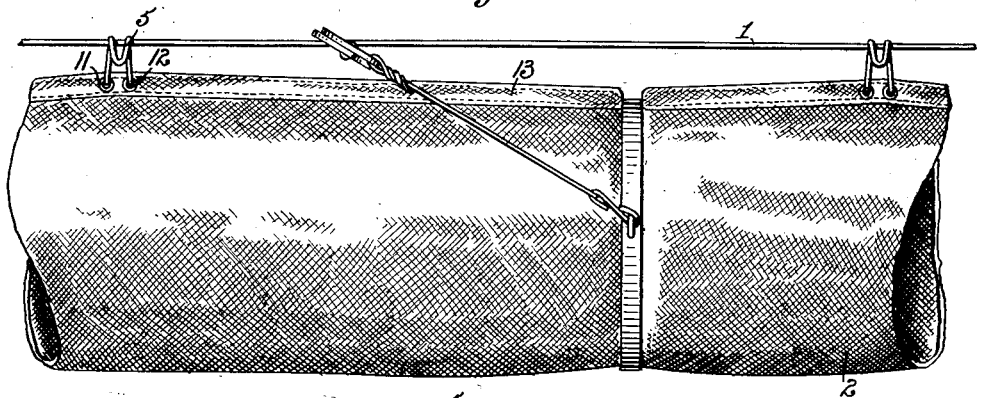
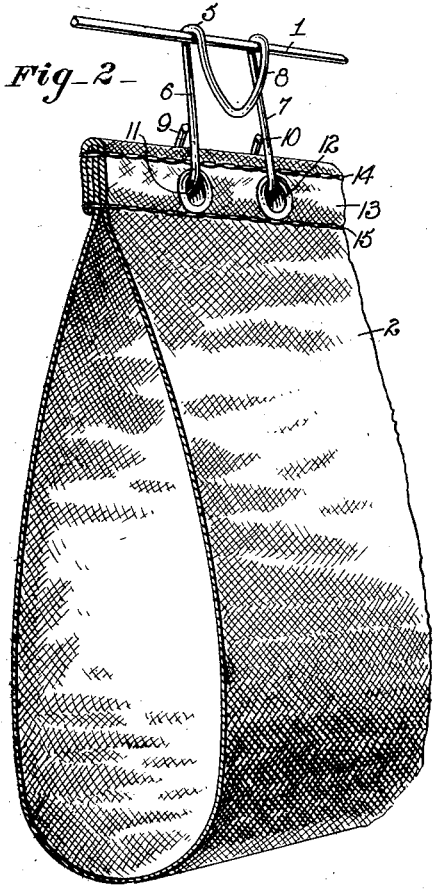
WITNESSES
Frank C. Palmer.
W. Kitchin.
INVENTOR
Norman B. Braly
BY
ATTORNEYS

UNITED STATES PATENT OFFICE.

NORMAN BLYTHE BRALY, OF BUTTE, MONTANA.

HOSE SUSPENSION.

1,261,008.   Specification of Letters Patent.   Patented Apr. 2, 1918.

Application filed November 22, 1916. Serial No. 132,767.

*To all whom it may concern:*

Be it known that I, NORMAN B. BRALY, a citizen of the United States, and a resident of Butte, in the county of Silver Bow and State of Montana, have invented a new and Improved Hose Suspension, of which the following is a full, clear, and exact description.

This invention relates to suspending devices for hose and particularly to a suspending device for canvas hose, and has for an object the provision of an improved simple and strong construction which will support the hose at a given place without injury to the hose.

Another object in view is to provide a supporting hose structure especially adapted for supporting canvas air hose whereby the hose is supported from above and held in such a position that a comparatively small air pressure will be sufficient for forcing a quantity of air through the hose.

In the accompanying drawing:—

Figure 1 is a side view of the abutting ends of two sections of canvas hose or pipe and supporting means embodying the invention associated therewith.

Fig. 2 is an enlarged detail perspective view showing the supporting construction.

Referring to the accompanying drawing by numerals, 1 is the supporting wire which may be connected to any suitable support in any desired way, said wire being designed to carry the weight of the various hose or pipe sections 2. The canvas hose or pipe 2 is designed especially to be used in mines and to direct air from one place to another so as to always provide a supply of fresh air in the various drifts or galleries of the mine.

As shown in Figs. 1 and 2, the present invention is arranged with supporting hooks 5 for supporting the hose sections 2 from above, whereby the walls of the hose will normally remain in substantially the position shown in Fig. 2 and thereby will allow a small pressure of air to freely pass therethrough without losing any of the energy in opening the walls of the hose. The hook 5 may be formed in various ways but is preferably provided with up-standing members 6 and 7, said up-standing members also merging into eyelets 9 and 10, said eyelets passing through the eyelets 11 and 12 in the section 13 of the hose 2. The eyelets 11 and 12 may be made of metal or other material as desired, preferably the ordinary metal eyelet clamped firmly in place so as to pinch against the material of section 13. In making the section 13 the upper edges of the walls of the hose are turned over, as shown in Fig. 2, and secured in position by lines of stitching 14 and 15, line 15 being an appreciable distance from the upper edge while line 14 is a short distance from the upper edge, thus providing ample material for preventing the eyelets 11 and 12 from pulling out. It will also be seen that the parts are reinforced by having the turned-over portions disclosed in Fig. 2. It is of course understood that pairs of eyelets as shown in Figs. 1 and 2 may be used when the hook 5 is used, or if desired several hooks could be used for each eyelet. It is also understood that single eyelets may be distributed along the section 13 for receiving a single hook without departing from the spirit of the invention, there being provided any suitable number of single eyelets or sets of eyelets as may be preferred. In arranging the section 13 the seam 15 insures a tight hose notwithstanding the arrangement of eyelets 11 and 12 as shown in Fig. 2. If the line of stitching 15 were not provided an aperture made in the section 13 would cause the hose to leak and therefore would be very objectionable, so that the stitching 15 assists in effecting two results, namely, the separation of section 13 from the body of the hose 2 and the binding of the folded-over sections together for providing ample material for receiving the hooks. It is of course evident that the lining in the hose or any other matter could be provided interiorly adjacent the line of stitching 15 so as to assist in preventing leakage.

What I claim is:

1. In a device of the character described, a hose provided with a flanged section comprising the bent-over portions of part of the hose and spaced seams for stitching together the bent-over portions whereby a reinforcing and comparatively stiffened structure is provided, and a plurality of eyelets in said flanged section between the lines of stitching, binding together the bent-over portions and forming eyes for the reception of suspending devices.

2. A tubular collapsible hose for ventilating purposes formed of fabric having longitudinal side margins disposed alongside each other in outstanding relation, the outer portions of the said outstanding margins being inturned to form a multiple ply flange, and means passing through all the plies of said flange for receiving the suspending devices whereby the hose may be suspended solely from said flange to permit its ready inflation without undue resistance.

3. A tubular collapsible hose for ventilating purposes formed of fabric having longitudinal side margins disposed alongside each other in outstanding relation, said outstanding margins being doubled back toward the body of the hose to form a relatively thick supporting flange, spaced lines of securing stitches passing through the doubled flange, at the inner and outer edges thereof, and eyelets passing through and binding together the several plies of fabric between the lines of stitching, said eyelets being adapted to receive suspending devices.

NORMAN BLYTHE BRALY.